United States Patent [19]

Krämer

[11] 4,143,912
[45] Mar. 13, 1979

[54] ADJUSTABLE HINGE JOINT

[75] Inventor: Erich Krämer, Remscheid, Fed. Rep. of Germany

[73] Assignee: Manfred Schlappig, Frohnhausen, Fed. Rep. of Germany

[21] Appl. No.: 781,182

[22] Filed: Mar. 25, 1977

[30] Foreign Application Priority Data

Mar. 27, 1976 [DE] Fed. Rep. of Germany ....... 2613195

[51] Int. Cl.² ............................................. A47C 1/025
[52] U.S. Cl. ....................................... 297/362; 16/143
[58] Field of Search ............... 297/362, 361, 373, 374, 297/355, 366; 16/143

[56] References Cited

U.S. PATENT DOCUMENTS

| 3,401,979 | 9/1968 | Putsch | 297/362 |
| 3,667,804 | 6/1972 | Yasui et al. | 297/362 |
| 3,972,563 | 8/1976 | Gustafsson | 297/362 |

FOREIGN PATENT DOCUMENTS 1170708  11/1969  United Kingdom ...................... 16/143

Primary Examiner—Roy D. Frazier
Assistant Examiner—William E. Lyddane
Attorney, Agent, or Firm—Martin A. Farber

[57] ABSTRACT

A hinge joint for adjustment of the angle of inclination of the backrest of a seat, particularly in motor vehicles, with a stationary articulated hinge lever and a pivotable articulated hinge lever, which articulated levers are pivotably mounted with respect to each other about a common axle by means of a handle, and each articulated lever has an inner gear rim on their sides facing one another. The inner gear rims have the same root base and gear tip diameters and jointly mesh in engagement with only a single disc comprising a toothed disc, the latter being rotatably mounted on an eccentric and movable in eccentric translation with the eccentric about the common axis of the two articulated hinge levers. One of the inner gear rims has at least one tooth less than that of the other inner gear rim, and the toothed disc has at least one tooth less than that of the inner gear rim with the smaller number of teeth.

6 Claims, 2 Drawing Figures

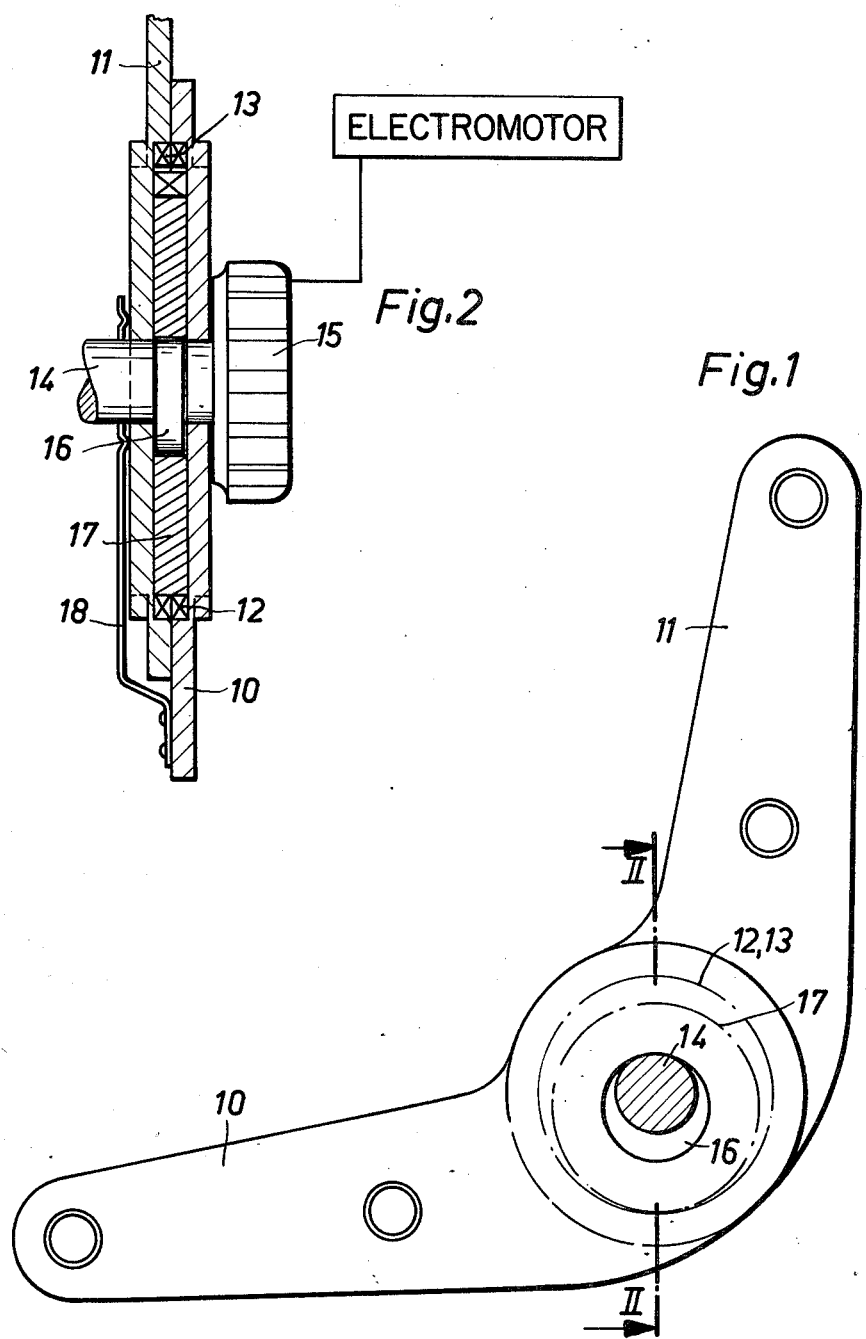

ADJUSTABLE HINGE JOINT

The invention relates to a hinge joint for the adjustment of the angle of inclination of the backrest of a seat, particularly in motor vehicles, with a stationary articulated hinge lever and a pivotable articulated hinge lever, which articulated levers are pivotably mounted mutually to one another about a common axis by means of a handle, and each articulated lever has an inner gear rim on their sides facing one another, which inner gear rims each mesh respectively with one disc, namely a toothed disc, which both are rotatably mounted on an eccentric and are movable in eccentric translation with the eccentric about the common axis of the two articulated levers.

With a known hinge or articulated joint of this type, the inner gear rims of the articulated levers as well as the toothed discs which mesh with the inner gear rims on the eccentric have different root diameters and outer or addendum diameters. The toothed discs are rigidly connected with one another to a common central wheel. The teeth of the gear rims and of the toothed discs which mesh with one another, with the same modulus differ by three pieces, respectively, so that during rotation of the eccentrically mounted toothed discs, one moves in rolling contact on the gear rim of the stationary articulated lever and the other moves in rolling contact on the gear rim of the pivotable articulated lever, and consequently the hinge joint pivots.

It is disadvantageous with these known hinge joints that two inner gear rims of different diameters are required, which must be fastened on the articulated hinge levers, whereby one is mounted in the other. Moreover two toothed discs of different diameters are necessary, which must be rigidly connected with each other.

The invention is based on the object to construct an adjustable or shiftable hinge joint of the introductory mentioned type such that with avoidance of the pointed out disadvantages and defects of the previously mentioned described state of the art, the hinge joint consists of a few individual parts, which are constructed more simply and are able to be produced more easily.

This task is solved in accordance with the present invention in the manner that the inner gear rims (e.g., 12, 13) have the same root diameter and addendum diameter and are jointly in engagement with only one toothed disc (17), whereby one of the two inner gear rims (12 or 13) has at least one tooth less than the other inner gear rim (13 or 12), and the toothed disc (17) has at least one tooth less than the inner gear rim with the smaller number of teeth.

The technical advance attained by the present invention touches on the following advantages. Instead of the two toothed discs of different diameters of the known pivot hinge, which must be individually or separately produced and then which must be rigidly connected with one another, only one toothed disc is required. Instead of two inner gear rims of different diameters, which must be individually produced and then which must be rigidly connected with each one pivot lever, two inner gear rims of the same diameters are necessary, which because of their unequal number of teeth to be sure also must be individually produced. The starting work pieces for the pivot levers can yet be equal with one another in size, shape and material. By the minimal difference of the number of teeth between the pivotably articulated hinge lever and the toothed disc on the one hand as well as the toothed disc and the stationary articulated hinge lever on the other hand, the pivot hinge is self-locking.

With the practical embodiment, the toothed disc is at least twice as wide as the two inner gear rims. In this manner it is guaranteed that the width of the teeth always is jointly in engagement with both of the inner gear rims.

Advantageously the teeth of the inner gear rims are pressed out from the articulated levers. In this manner it is not necessary to separately produce the inner gear rims and thereafter to rigidly connect them with the articulated lever.

With the above and other objects and advantages in view, the present invention will become more clearly understood in connection with the following detailed description of a preferred embodiment, when considered with the accompanying drawings, of which:

FIG. 1 is a side view of the hinge joint in accordance with the present invention; and FIG. 2 is a section taken along the lines II—II of FIG. 1.

The hinge joint comprises a stationary articulated lever 10 and an articulated lever 11 which is pivotable with respect to the latter. The stationary hinge lever 10 is rigidly connected with the seat part, and the swingable hinge lever 11 is rigidly connected with the backrest of a seat, particularly in a motor vehicle. An inner toothed gear rim 12 is pressed out from the stationary articulated lever 10, and an inner toothed gear rim 13 is pressed out of the pivotable articulated lever 11. The root circle (or dedendum) and the addendum circle of both inner gear rims 12 and 13 are of equal size, and their number of teeth differ from one another by one tooth.

The articulated hinge levers 10 and 11 are pivotally mounted about a common axis which is arranged concentrically to their inner gear rims 12 and 13. Furthermore they are rotatably mounted on a shaft 14, which shaft is rigidly connected on one of its ends with a hand wheel 15. In the space between the two articulated levers 10 and 11, the shaft 14 is provided with an eccentric 16, on which eccentric a toothed disc or ratchet gear 17 is freely (without connection) rotatably mounted. The toothed disc 17 is sufficiently wide such that it engages in the teeth of both inner gear rims 12 and 13. The eccentricity of the eccentric 16 is selected such that the rotating toothed disc 17 moves in rolling contact on the inner gear rims 12 and 13. The toothed disc 17 has one tooth less than the inner gear rim with the lower number of teeth. A spring 18 presses the pivotable hinge lever 11 constantly against the hinge lever 10 and thus holds the hinge joint together.

The manner of operation of the hinge joint is as follows:

If the hand wheel 15 is turned one time by 360 degrees, the eccentric 16 rolls-off the toothed disc 17 one time in the two inner gear rims 12 and 13 and thereby pivots the gear rim with the number of teeth larger by one tooth against the other gear rim by one tooth division. For shifting or adjustment of the inner gear rims 12 and 13 against one another, the following valves result with a rotation of the eccentric 16 and by a selection of the following number of teeth z of the inner gear rims 12 and 13, and of the toothed disc 17, respectively:

$z = 41/40/39$: $-360/40 = 9$ degrees
$z = 61/60/59$: $-360/60 = 6$ degrees $z = 51/50/49: -360/50 = 7$ degrees $12'$ With a sufficiently small tooth division, the eccentricity of the eccentric 16 is so small that the adjustment device provides an automatic interlocking or self-locking action.

Of course, one hinge joint can be arranged, respectively, on each of the two sides of the seat, particularly in motor vehicles, the shafts 14 of which, then are connected with one another by a drive rod. Also an electromotor can tread or step on the position of the hand wheel 15, which electromotor then is yet advantageously arranged between both hinge joints, approximately in the center of the drive rod, which drive rod furthermore can be interrupted and can be coupled with both ends of the motor shaft or can be guided by the hollow motor shaft and can be rigidly connected with the latter.

If the pillow of the seat part is rounded on its rear closing edge, the shaft 14, which connects the hinge joints on both sides of the seat part, is constructed as a bendable or flexible shaft.

I claim:

1. A hinge joint for adjustment of the angle of inclination of the backrest of a seat, particularly in motor vehicles, comprising
  a common axle having a handle,
  a stationary articulated hinge lever and a pivotable articulated hinge lever pivotally supported with respect to each other about said common axle,
  each of said hinge levers having an inner gear rim on sides thereof facing one another, said inner gear rims having equal diameters having equal root diameters and addendum diameters,
  an eccentric on said common axle,
  only a single disc constituting a toothed disc rotatably supported on said eccentric and with said eccentric being movable eccentrically about said common axle of both of said hinge levers, said toothed disc being jointly in engagement with said inner gear rims of said hinge levers and formed with a control opening complementary to said eccentric, the latter disposed freely rotatably complementarily in said central opening of said toothed disc, said toothed disc being movable in rolling contact on said inner gear rims by rotation of said eccentric, said toothed disc having an addendum diameter smaller by at least the height of one tooth than the root circle of said inner gear rims,
  one of said inner gear rims having at least one tooth less than that of the other of said inner gear rims, and said toothed disc having at least one tooth less than that of said one inner gear rim with the smaller number of teeth.

2. The hinge joint as set forth in claim 1, wherein said toothed disc is at least double in width than that of both of said inner gear rims.

3. The hinge joint as set forth in claim 1, wherein the teeth of said inner gear rims are pressed-out from said hinge levers, respectively.

4. The hinge joint as set forth in claim 1, further comprising
  an electromotor means for driving said handle.

5. The hinge joint as set forth in claim 1, wherein said common axle forms two identical and axially aligned cylindrical axle portions on both sides of said eccentric, respectively, said hinge levers are formed with axially aligned bearings defining openings of the same diameter, respectively, mounted on said axially aligned cylindrical axle portions of said common axle, respectively.

6. A hinge joint for adjustment of the angle of inclination of the backrest of a seat, particularly in motor vehicles, comprising
  a common axle having a handle,
  a stationary articulated hinge lever and a pivotable articulated hinge lever pivotally supported with respect to each other about said common axle,
  each of said hinge levers having an inner gear rim on sides thereof facing one another, said inner gear rims having equal diameters having equal root diameters and addendum diameters,
  an eccentric on said common axle,
  only a single disc constituting a toothed disc rotatably supported on said eccentric and with said eccentric being movable eccentrically about said common axle of both of said hinge levers, said toothed disc being jointly in engagement with said inner gear rims of said hinge levers and formed with a control opening complementary to said eccentric, the latter disposed freely rotatably complementarily in said central opening of said toothed disc, said toothed disc being movable in rolling contact on said inner gear rims by rotation of said eccentric, said toothed disc having an addendum diameter smaller by at least the height of one tooth than the root circle of said inner gear rims,
  one of said inner gear rims having at least one tooth less than that of the other of said inner gear rims, and said toothed disc having at least one tooth less than that of said one inner gear rim with the smaller number of teeth,
  said common axle forms two identical and axially aligned cylindrical axle portions on both sides of said eccentric, respectively, said hinge levers are formed with axially aligned bearings defining openings of the same diameter, respectively, mounted on said axially aligned cylindrical axle portions of said common axle, respectively,
  said hinge levers include inwardly stepped outer annular portions having planar face portions slidably rotatably abutting each other, and spring means extends from one of said hinge levers on an outer surface of one of said annular portions to adjacent said common axle pressing the other of said hinge levers toward said one of said hinge levers,
  said inner gear rims and said toothed disc respectively have $x, x-1$ and $x-2$ teeth, where x is the number of teeth of said other inner gear rim.

* * * * *